United States Patent [19]

Tadokoro et al.

[11] Patent Number: 4,488,531
[45] Date of Patent: Dec. 18, 1984

[54] PLURAL INTAKE SYSTEM FOR SUPERCHARGED ENGINE

[75] Inventors: Tomoo Tadokoro; Haruo Okimoto; Masami Nakao, all of Hiroshima; Masato Iwaki, Higashi Hiroshima, all of Japan

[73] Assignee: Mazda Motor Corporation, Hiroshima, Japan

[21] Appl. No.: 363,772

[22] Filed: Mar. 31, 1982

[30] Foreign Application Priority Data

Apr. 6, 1981 [JP] Japan .................................. 56-52252
Jul. 13, 1981 [JP] Japan ................................ 56-109656

[51] Int. Cl.³ ............................................. F02B 25/00
[52] U.S. Cl. .................................... 123/559; 123/432
[58] Field of Search ...................... 60/600, 605, 611; 123/308, 432, 559

[56] References Cited

U.S. PATENT DOCUMENTS 4,164,205 8/1979 Asanomi et al. .................... 123/432
4,246,874 1/1981 Nakagawa et al. ................. 123/432

FOREIGN PATENT DOCUMENTS 210887 6/1938 France ................................. 123/432
48003 3/1980 Japan ................................. 123/559

Primary Examiner—Michael Koczo
Assistant Examiner—Peggy A. Neils
Attorney, Agent, or Firm—Wenderoth, Lind & Ponack

[57] ABSTRACT

A fuel intake system for a supercharged automotive engine having at least one engine cylinder with first and second fuel intake ports and exhaust port comprises first fuel intake passage communicated at one end to the first fuel intake port and at the other end to the supercharger through a first throttle valve, and a second fuel intake passage communicated at one end to the second fuel intake port and at the other end to the supercharger through a second throttle valve. These intake and exhaust ports are adapted such that the first fuel intake port opens at a timing preceding the closure of the exhaust port and the second fuel intake port opens after the opening of the first fuel intake port.

5 Claims, 4 Drawing Figures

4,488,531

PLURAL INTAKE SYSTEM FOR SUPERCHARGED ENGINE

BACKGROUND OF THE INVENTION

The present invention relates to a fuel intake system for a supercharged automotive engine.

A supercharged engine, especially a turbocharged engine, is currently known which includes a turbocharger comprised of a turbine and a compressor driven by the turbine for increasing the amount of air-fuel mixture delivered to the engine. With the turbocharger, it is possible to boost the engine power output and also to increase the automobile mileage per gallon of fuel.

In this prior art supercharged engine, it has been found that the temperature of the air-fuel mixture to be delivered to the engine tends to increase during the operation of the supercharger. This is because, while the air-fuel mixture being compressed by the compressor of the supercharger is heated, the air-fuel mixture is further heated when mixed with a high temperature, dilution gas, i.e., a portion of exhaust gases remaining inside the engine and which has not been completely exhausted. The increased temperature of the air-fuel mixture is often-times liable to increase the temperature and pressure inside the engine which tend to constitute a cause of the occurrence of engine knocking.

The increase of the temperature of the supercharged air-fuel mixture can be minimized by lowering the performance of the supercharger compressor, but this technique is counter to the maximum utilization of the supercharger.

Alternatively, it may also be minimized by the use of a cooler for cooling the supercharged air-fuel mixture prior to it being delivered to the engine, such as disclosed in, for example, in the U.S. Pat. No. 4,010,613, patented Mar. 8, 1977.

Although the specification of the above listed U.S. Patent is silent as to whether or not the possibility of occurrence of the engine knocking can be minimized, it describes that the engine combustion temperature can be lowered thus minimizing the production of obnoxious oxides of nitrogen in the engine exhaust. In any event, although it appears that the lowering of the engine combustion temperature such as achieved in the above listed U.S. Patent is effective to minimize the occurrence of the engine knocking as well, the use of the cooler renders the engine fuel intake system complicated and costly.

In order to minimize the occurrence of the engine knocking without relying on the cooler such as used in the, above listed U.S. Patent, it can be contemplated to open the fuel intake port at a time shortly before the closure of an exhaust port so that the supercharged air-fuel mixture can, as it enters the engine cylinder through the fuel intake port, expel the dilution gas out of the engine cylinder through the exhaust port which has not yet been closed. This may be effective where the engine is operated under a high load operating condition, but this contemplated method poses a problem particularly when the engine is operated under a low load operating condition during which the supercharger is generally brought to a halt. Specifically, during the low load engine operating condition, the air-fuel mixture to be delivered to the engine is not supercharged and is under a pressure lower than the exhaust gas pressure. Therefore, the dilution gas tends to remain inside the engine cylinder in so large an amount as to result in reduction in combustibility and also in drivability of the engine.

SUMMARY OF THE INVENTION

Accordingly, the present invention has been developed with a view to substantially eliminating the disadvantages and inconveniences inherent in the prior art systems and has for its essential object to provide an improved fuel intake system for a supercharged automotive engine wherein no cooler such as disclosed in the previously discussed U.S. patent is employed, but the occurrence of the engine knocking is advantageously minimized.

Another important object of the present invention is to provide an improved fuel intake system of the type referred to above, which has a simple structure and is reliable in performance and which can be employed in an existing automobile engine with a slight modification and without unreasonably increasing the cost.

According to the present invention, the supercharged engine has at least one combustion chamber having first and second fuel intake ports and an ehaust port. These ports are adapted such that the first fuel intake port opens at a time preceding the closure of the exhaust port and the second fuel intake port opens after the opening of the first fuel intake port. Also, first and second throttle valves are provided in fuel intake passages leading respectively to the first and second intake ports for regulating the flow of air therethrough.

With the construction according to the present invention, the dilution gas which tends to increase the temperature of the air-fuel mixture when it admixes with the latter can be forcibly expelled from the engine cylinder and, therefore, the undue increase of the combustion temperature can be minimized.

BRIEF DESCRIPTION OF THE DRAWINGS

These and other objects and features of the present invention will readily be understood from the following description of preferred embodiments thereof taken in conjunction with the accompanying drawings, in which.

DETAILED DESCRIPTION OF THE INVENTION

Figure 1:
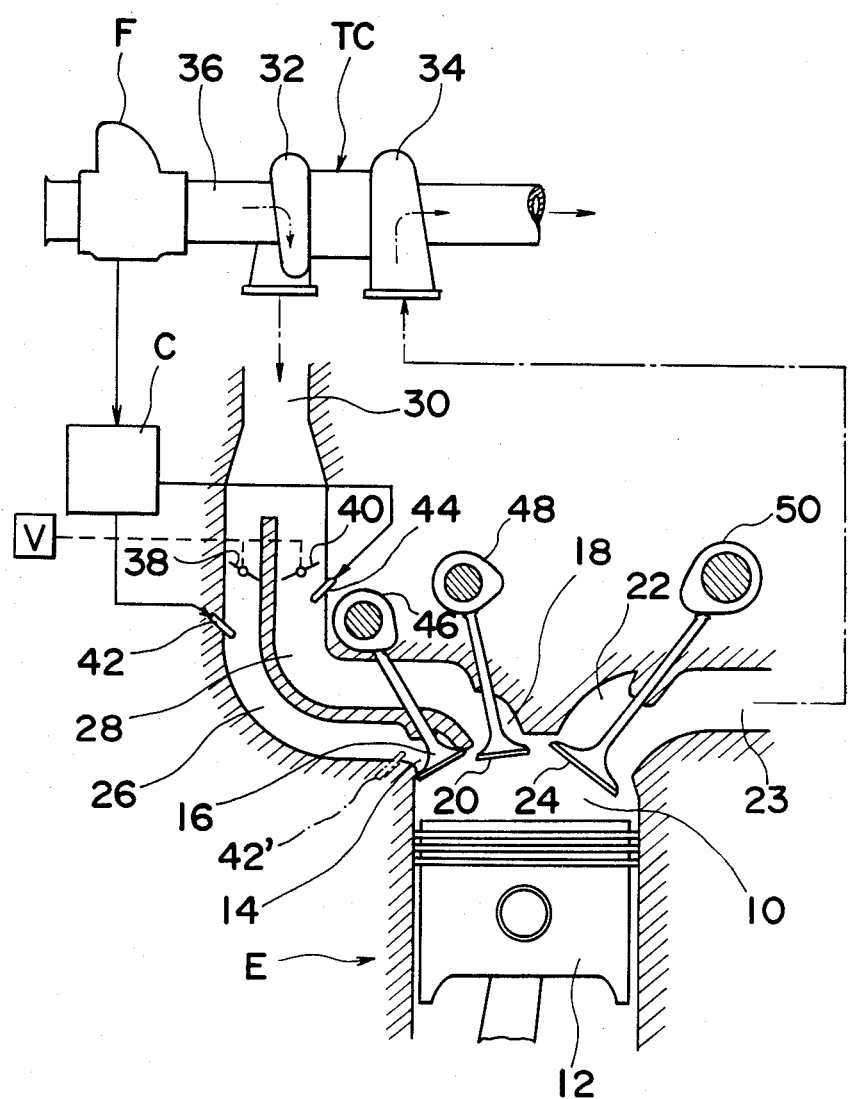
FIG. 1 is a diagram showing a fuel intake system for a turbocharged engine according to a preferred embodiment of the present invention with the engine partially shown in section.

Before the description of the present invention proceeds, it is to be noted that like parts are designated by like reference numerals throughout the accompanying drawings.

Referring first to FIG. 1 in which a single cylinder engine for an automobile is shown, the engine, generally identified by E, includes a combustion chamber 10 with a piston 12 therein, a primary intake port 14 adapted to be selectively closed and opened by a primary intake valve 16, a secondary intake port 18 located in the vicinity of the primary intake port 14 and adapted to be selectively closed and opened by a secondary intake valve 20, and an exhaust port 22 adapted to be selectively closed and opened by an exhaust valve 24. The primary and secondary intake ports 14 and 18, both opening into the combustion chamber 10, are communicated through separate, primary and secondary fuel passages 26 and 28, respectively, with a common intake duct 30 which is in turn communicated with a compressor 32 forming a turbocharger TC together with a turbine 34 for driving the compressor 32.

As is well known to those skilled in the art, the turbocharger TC has a construction wherein the turbine 34 drives the compressor 32, as exhaust gases discharged from the chamber 10 through the exhaust port 22 by way of an exhaust passage 23 flow through the turbine 34, to drawn air from the atmosphere into the common intake duct 30 through a flow meter F intalled on a pipe 36 leading from the atmosphere or an air cleaner (not shown) to an air intake opening of the compressor 32.

The primary and secondary fuel passages 26 and 28 have primary and secondary throttle valves 38 and 40 installed therein, respectively, each for regulating the flow of air introduced into the respective fuel passage 26 or 28 from the common intake duct 30, and also have fuel injection nozzles 42 and 44 positioned down stream of the associated throttle valves 38 and 40 with respect to the direction of flow of air-fuel mixture towards the combustion chamber 10 for injecting fuel into the primary and secondary fuel passages 26 and 28, respectively. The injection of fuel into the primary and secondary fuel passages 26 and 28 is controlled by a known computer-controlled fuel injection control unit C in response to an output signal generated from the flowmeter F. The output signal from the flowmeter F is indicative of the rate of flow of air therethrough, and the control unit C upon receipt of the output signal from the flowmeter and other known electric intelligence signals indicative of engine operating conditions controls the primary and secondary injection nozzles 42 and 44 in such a manner that fuel is injected into the primary fuel passage 26 through the nozzle 42 during a low load operating condition of the engine E during which a relatively small amount of air is required, and into both of the primary and secondary fuel passage 26 and 28 through the associated nozzles 42 and 44 during a high load engine operating condition during which a relatively large amount of air is required. In any event, the fuel injection system including the flowmeter F and the control unit C is well known to those skilled in the art and, therefore, the details thereof are herein omitted for the sake of brevity.

The primary fuel passage 26 has a transverse cross-sectional area smaller than that of the secondary fuel passage 28, preferably about two third of the transverse cross-sectional area of the secondary fuel passage 28. The fuel intake system so far described is generally referred to as a dual fuel intake system wherein, during the low load engine operating condition, only the primary throttle valve 38 is opened by throttle valve operating means V for supplying at an increased velocity an air-fuel mixture to the combustion chamber 10 only through the primary fuel passage 26 thereby to enhance the combustion of the supplied air-fuel mixture inside the combustion chamber 10, but during the high load engine operating condition both of the primary and secondary throttle valves 38 and 40 are opened to supply the air-fuel mixture into the combustion chamber 10 through the respective fuel passages 26 and 28 thereby to increase the charge efficiency in the combustion chamber 10 so that an increased engine power output can be obtained. The throttle valve operating means V is a conventional means such as disclosed in U.S. Pat. Nos. 4,246,874 or 4,164,205.

Figure 2:
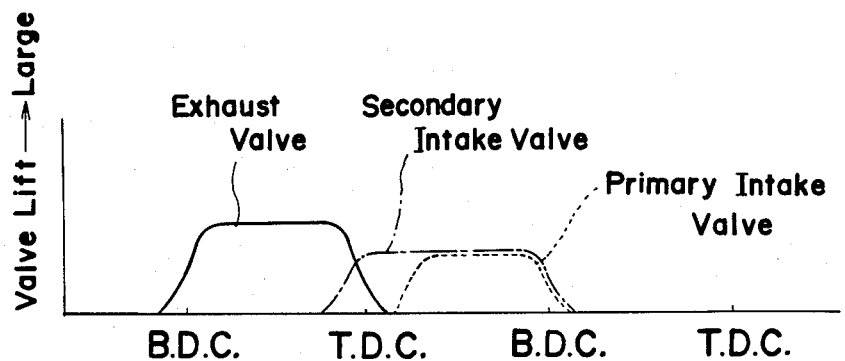
FIG. 2 is a graph showing the relationship of the operation of primary and auxiliary intake valves and an exhaust valve in the system shown in FIG. 1.

The valves 16, 20 and 24 are operatively associated with adequately shaped cams 46, 48 and 50, respectively, which are in turn operatively associated with a known crank shaft (not shown), so that the ports 14, 18 and 22 can be selectively opened and closed by the associated valves 16, 20 and 24 in a predetermined timed sequence. So far as the illustrated embodiment is concerned, the timed sequence for the selective opening and closure of the ports 14, 18 and 22 by the associated valves 16, 20 and 24 is such that, as shown in the graph of FIG. 2 wherein the legends "B.D.C." and "T.D.C." represent respective abbreviations of "Bottom Dead Center" and "Top Dead Center" indicative of the different operative positions of the piston 12 as is well known to those skilled in the art, the opening of the primary intake port 14 takes place simultaneously with or shortly before the closure of the exhaust port 22, but a predetermined length of time subsequent to the opening of the secondary intake port 18 which takes place at a time a predetermined length of time prior to the closure of the exhaust port 22. It is to be noted that, where the time at which the primary intake port 14 is opened is shortly before the closure of the exhaust port 22, the time span between the opening of the secondary intake port 18 and the closure of the exhaust port 22 should not be smaller than that between the closure of the exhaust port 22 and the opening of the primary intake port 14. In any event, this timed sequence can be accomplished by adequately shaping and designing the cams 46, 48 and 50 and/or adequately designing a mechanical linkage between the cams 46, 48 and 50 and the engine crank shaft.

Hereinafter, the operation of the turbocharged engine E embodying the present invention as shown in FIGS. 1 and 2 will be described.

Assuming that the engine E is operated under the high load operating condition, the turbocharger TC is in operation and the throttle valves 38 and 40 are opened. However, during the simultaneous opening of the secondary intake port 18 and the exhaust port 22 while the engine E is operated under the high load operating condition, the incoming air flowing into the common intake duct 30 past the compressor 32 being driven by the turbine 34 is at a pressure higher than the pressure of exhaust gases discharged from the combustion chamber 10 into the exhaust passage 23 and, therefore, as the air-fuel mixture enters the combustion chamber 10, through the secondary intake port 18, a dilution gas (i.e., a gas remaining inside the combustion chamber without being completely exhausted therefrom) can advantageously be forcibly expelled into the exhaust passage 23 through the exhaust port 22. As a result thereof, the amount of the dilution gas remaining in the combustion chamber is reduced and the increase of the temperature of the air-fuel mixture supplied into the combustion chamber 10 and, hence, the increase of the combustion temperature, which would result from the presence of and admixture with the dilution gas, can consequently be minimized or substantially eliminated with the minimized possibility of occurrence of engine knocking.

Where the engine E is operated under the low load operating condition in which the turbocharger TC is brought to a half speed and the supply of the air-fuel mixture into the combustion chamber 10 is effected only through the primary intake passage 26, the pressure of the incoming air flowing into the common intake duct 30 past the compressor 32 becomes lower than that of the exhaust gases discharged into the exhaust passage 23 during the similutaneous opening of the secondary intake port 18 and the exhaust port 22 and, therefore, the dilution gas may enter the secondary intake passage 28 through the secondary intake port 18, but does not enter the primary intake passage 26 through the primary intake port 14 because the latter has not yet been opened. Even though the dilution gas may enter the secondary intake passage 28 as hereinabove discussed, the amount thereof is so small that the combustion that takes place in the combustion chamber 10 will not be adversely affected and, therefore, the performance of the engine will not be reduced.

It is to be noted that the timed sequence of the selective opening and closure of the ports 14, 18 and 22 may be modified in such a manner that the opening of the secondary intake port 18 takes place at a time simultaneously with or shortly before the closure of the exhaust port 22, but a predetermined length of time subsequent to the opening of the primary intake port 14 which takes place at a timing spaced a predetermined length of time prior to the closure of the exhaust port 22. In this modified timed sequence, where the timing at which the secondary intake port 18 is opened is shortly before the closure of the exhaust port 22, the time span between the opening of the primary intake port 14 and the closure of the exhaust port 22 should not be smaller than that between the opening of the secondary intake port 18 and the closure of the exhaust port 22. In any event, this modified timed sequence may be considered a version in which the times of operation of the primary and secondary intake valves 16 and 20 relative to the exhaust valve 24 are reversed as compared with the previously described timed sequence.

The question of which one of the previously mentioned timed sequence and the modified timed sequence is to be employed for a particular supercharged automobile engine may be solved by consideration of the operating characteristics of such engine. More specifically, the first described timed sequence is advantageous in that, during the low load engine operating condition, there is no possibility that the flow of fuel wetting the wall surface of the primary intake passage 26 is disturbed by the dilution gas if the latter should actually enter the primary intake passage 26 and, therefore, the supply of the air-fuel mixture into the combustion chamber 10 can be effected in a stabilized manner for each cycle of operation of the engine E, although the amount of the dilution gas entering the secondary intake passage 28 during the simultaneous opening of the ports 18 and 22 while the engine is operated under the low load operating condition tends to be larger than that during the same condition according to the modified timed sequence because the secondary intake passage 28 is larger in cross-sectional area than the primary intake passage 26.

On the other hand, although according to the modified timed sequence the amount of the dilution gas entering the primary intake passage 26 during the simultaneous opening of the ports 14 and 22 while the engine E is operated under the low load operating condition is smaller than that during the same condition according to the first described timed sequence, there is a possibility in the modified timed sequence that the flow of fuel wetting the wall surface of the primary intake passage 26 is disturbed by the dilution gas when the latter actually enters the primary intake passage 26. However, this possibility can be substantially eliminated if the primary fuel injection nozzle 42 which has been described as positioned adjacent to and downstream of the primary throttle valve 38 is positioned adjacent to the primary intake port 14 as shown by the phantom line 42′.

In view of the foregoing, it will readily be seen that, where a particular supercharged engine has a design tending to be adversely affected by the back flow of the dilution gas, the valves 16 and 20 should be so designed as to be operated according to the modified timed sequence relative to the exhaust valve 24 whereas, where a particular supercharged engine has a design wherein the supply of the air-fuel mixture tends to fluctuate with a change in cycle of operation of the engine, the valves 16 and 20 should be so designed as to be operated according to the first described timed sequence relative to the exhaust valve 24.

The determination of the time span in which the opening of either one of the secondary and primary intake ports 18 and 14 overlaps the opening of the exhaust port 22 may be carried out by consideration of the air-fuel mixing ratio, the position of the fuel supply, the ratio of cross-sectional areas of the primary and secondary intake passages, and other engine design parameters.

Although the foregoing description of the present invention has been directed to a single cylinder, supercharged automobile engine, it may equally apply to any multi-cylinder, supercharged engine. However, the use of the throttle valve pair for each cylinder of the multi-cylinder, supercharged engine makes the system complicated and requires a correspondingly increased number of ducts and, therefore, is uneconomical and somewhat impractical. This is particularly true where the engine has three or more engine cylinders. In such case, a design may be employed wherein, while the primary intake ports of all of the engine cylinders are communicated with the supercharger compressor through a single primary throttle valve, the secondary intake ports of all of the engine cylinders are grouped into two groups and are communicated with the same supercharger compressor through respective secondary throttle valves for each group. This will be described with reference to FIG. 3 wherein a four-cylinder turbocharged engine is schematically shown as an example.

Figure 3:
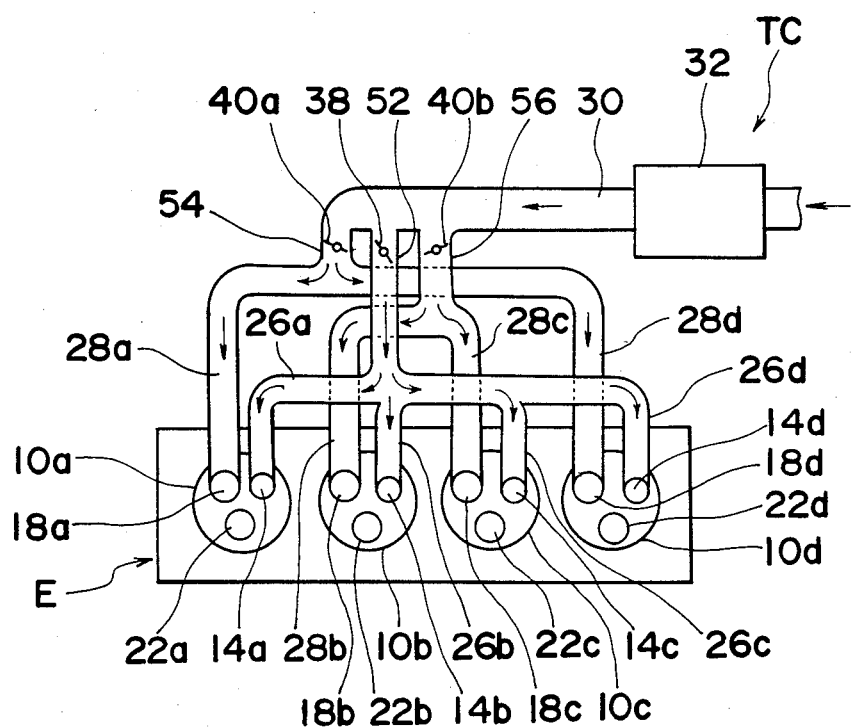
FIG. 3 is a schematic diagram showing one example of application of the fuel intake system of the present invention to a turbocharged, multi-cylinder engine.

Referring now to FIG. 3, the engine E is shown as having four cylinders or combustion chambers 10a, 10b, 10c and 10d, the primary intake ports of the respective combustion chambers being designated by 14a, 14b, 14c and 14d, the secondary intake ports of these respective combustion chambers being designated by 18a, 18b, 18c and 18d, and the exhaust ports of these respective combustion chambers being designated by 22a, 22b, 22c and 22d. In this embodiment, the primary intake passage consists of single primary intake passage 52 with the primary throttle valve 38. This primary intake passage 52 is communicated at one end with the common intake duct 30 and at the other end is branched into four branch passages 26a, 26b, 26c and 26d from a position downstream of the primary throttle valve 38. These branch passages 26a, 26b, 26c and 26d terminate in communication with the respective engine cylinders or combustion chambers 10a, 10b, 10c and 10d through the respective primary intake ports 14a, 14b, 14c and 14d.

On the other hand, the secondary intake passage means consists of two secondary intake passages 54 and 56 with the respective secondary throttle valves 40a and 40b. These secondary intake passages 54 and 56 are communicated respectively at one end with the common intake duct 30. Of these secondary intake passages, the secondary intake passage 54 is branched at the other end into two branch passages 28a and 28d from a position downstream of the secondary throttle valve 40a. These branch passages 28a and 28d terminate in communication with the engine cylinders or combustion chambers 10a and 10d through the respective secondary intake ports 18a and 18d. Likewise, the other secondary intake passage 56 is branched at the other end into two branch passages 28b and 28c from a position downstream of the secondary throttle valve 40b, and these branch passages 28b and 28c terminate in communication with the engine cylinders or combustions 10b and 10c through the respective secondary intake ports 18b and 18c. Although not shown, the exhaust ports 22a, 22b, 22c and 22d of respective combustion chambers 10a, 10b, 10c and 10d are in practice aggregated into a single exhaust passage which is in turn communicated to the atmosphere through the turbocharger turbine (shown by 34 in FIG. 1) and then through any known exhaust gas purifying device. The arrangement and connection of the branch passages 28a to 28d in the manner as shown in FIG. 3 are applicable where the firing of the supplied air-fuel mixture takes place in the sequence of the combustion chamber 10a, the combustion chamber 10c, the combustion chamber 10d and the combustion chamber 10b. In other words, the secondary intake ports 18a to 18d of the respective combustion chambers 10a to 10d are grouped into two secondary intake systems each including the secondary intake ports of the associated combustion chambers adapted to be separated in terms of the ignition timing, that is, those in which the firing does not take place sequentially. So far shown, one secondary intake system includes the secondary intake ports 18a and 18d, and their associated branch passages 28a and 28d of the secondary intake passage 54 communicated respectively to the combustion chambers 10a and 10d, whereas the other secondary intake system includes the secondary intake ports 18b and 18c and their associated branch passages 28b and 28c of the secondary intake passage 56 communicated respectively to the combustion chambers 10b and 10c, the firing in any one of the combustion chambers 10a and 10d being adapted to take place subsequent to or prior to the firing in any one of the combustion chambers 10b and 10c.

This arrangement described with reference to FIG. 3 is advantageous in the elimination of any possible interference in supply of the air-fuel mixture between the neighbouring secondary intake passages and is, as readily understood by those skilled in the art, equally applicable even to a six-cylinder engine.

Figure 4:
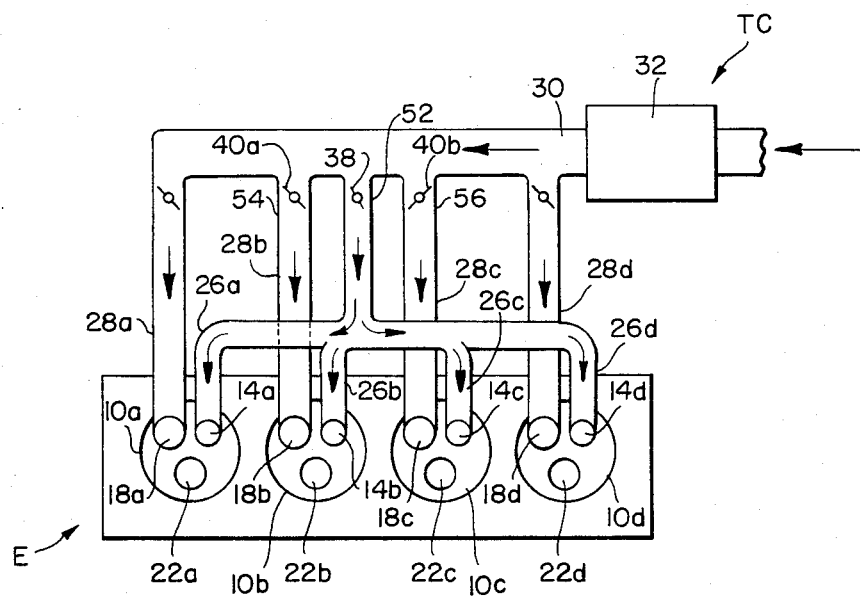
FIG. 4 is a view similar to FIG. 3 showing a modification thereof.

It is to be noted that, in the arrangement shown in FIG. 3, the secondary throttle valves 40a and and 40b are so designed as to be opened and closed in unison with each other and, for this purpose, may be linked to each other in any known manner. It is also to be noted that, although two secondary intake systems have been provided in the embodiment shown in FIG. 3, when the concept of the present invention is applied even to the six-cylinder engine, the secondary intake ports may be grouped into three secondary intake systems particularly in the case of an engine having six or more cylinders, as shown in FIG. 4. Further, it will be understood that there could be a second passage with a throttle valve in it for each of the cylinders 22.

Although the present invention has fully been described in connection with the preferred embodiments thereof with reference to the accompanying drawings, it is to be noted that various changes and modifications are apparent to those skilled in the art. By way of example, although the use of the fuel injection system has been referred to, the fuel supply system may be constituted by any known carburetor instead of the fuel injection system.

Also, in the illustrated embodiment, the fuel injection nozzles have been described as employed one for each of the primary and secondary intake passage. However, the one of the fuel injection nozzles in the secondary intake passage may be omitted, in which case arrangement should be made to allow the fuel injected from the fuel injection nozzle in the primary intake passage or the air-fuel mixture flowing through the primary intake passage, to flow into the secondary intake passage.

Accordingly, such changes and modifications are to be understood as included within the true scope of the present invention unless they depart therefrom.

We claim:

1. A fuel intake system for a supercharged automotive engine having a cylinder means with first and second fuel intake ports and an exhaust port, which comprises, in combination:

a supercharger for drawing in and supercharging air from outside the system;

a fuel intake passage system extending between the supercharger and the cylinder means of the engine and including first and second passage means, said first passage means being communicated at one end with the supercharger and at the other end with the first fuel intake port of the cylinder means and having therein a first throttle valve operable during at least a low load engine operating condition for regulating the flow of air therethrough, said second passage means being communicated at one end with the supercharger and at the other end with the second fuel intake port and having therein a second throttle valve operable during a high load engine operating condition for regulating the flow of air therethrough, means for opening said second fuel intake port at a time preceding the closure of the exhaust port and for opening said first fuel intake port after the opening of the second fuel intake port; and a fuel supply means for supplying fuel into the fuel intake passage system for creating in admixture with the air flowing therethrough a combustible air-fuel mixture and supplying said mixture to said passage means for flow in the cylinder means.

2. A system as claimed in claim 1, wherein the engine is multi-cylinder engine having a plurality of engine cylinders, and wherein said first passage means comprises a single first passage with the first throttle valve therein and being communicated at one end with the supercharger and having the other end branched into a plurality of branch passages from a position downstream of the first throttle valve with respect to the direction of flow of the air-fuel mixture towards the engine, said branch passages being equal in number to the number of the engine cylinders and terminating in communication with the respective engine cylinders through the respective first fuel intake ports, and said second passage means comprises at least two second passages with a second throttle valve provided in each second passage, each of said second passages being communicated at one end with the supercharger and having the other end branched into a plurality of branch passages from a position downstream of the respective second throttle valve with respect to the direction of flow of the air-fuel mixture towards the engine, said respective branch passages of all of said second passage means being equal in number to the number of the engine cylinders and terminating in communication with the associated engine cylinders through the respective second fuel intake ports, the branch passages of each of said second passages being communicated with the respective engine cylinders which are fired at times other than in sequence.

3. A system as claimed in claim 1, wherein the engine is a multi-cylinder engine having a plurality of engine cylinders, and wherein said first passage means comprises a single first passage with the first throttle valve therein, said single first passage being communicated at one end with the supercharger and having the other end branched into a plurality of branch passages from a position downstream of the first throttle valve with respect to the direction of flow of the air-fuel mixture towards the engine, said branch passages being equal in number to the number of the engine cylinders and terminating in communication with respective engine cylinders through the respective first fuel intake ports, and said second passage means comprises a plurality of second passages equal in number to the number of the engine cylinders, each of said second passages having a second throttle valve therein and being communicated at one end with the supercharger and at the other end to a corresponding one of the engine cylinders through the second fuel intake port of the corresponding engine cylinder.

4. A fuel intake system for a supercharged automotive engine having a cylinder means with first and second fuel intake ports and an exhaust port, which comprises, in combination:

a supercharger for drawing in and supercharging air from outside the system;

a fuel intake passage system extending between the supercharger and the cylinder means of the engine and including first and second passage means, said first passage means being communicated at one end with the supercharger and at the other end with the first fuel intake port of the cylinder means, said second passage means being communicated at one end with the supercharger and at the other end with the second fuel intake port, means for regulating the flow of air through said first and second passage means according to engine operating condition, said regulating means closing said second passage means during a low load engine operating condition, means for opening said second fuel intake port at a time preceding the closure of the exhaust port and for opening said first fuel intake port after the opening of the second fuel intake port; and a fuel supply means for supplying fuel into the fuel intake passage system for creating in admixture with the air flowing therethrough a combustible air-fuel emixture and supplying said mixture to said passage means for flow in the cylinder means.

5. A system as claimed in claim 4, wherein said means for regulating the flow of air comprises a throttle valve in said second passage means.

* * * * *